United States Patent
Moon

(10) Patent No.: US 11,760,901 B2
(45) Date of Patent: Sep. 19, 2023

(54) FILM FORMING FORMULATION AND COMPOSITION THEREOF

(71) Applicant: Illinois Tool Works Inc., Glenview, IL (US)

(72) Inventor: Douglas E. Moon, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/515,746

(22) Filed: Jul. 18, 2019

(65) Prior Publication Data

US 2020/0024477 A1    Jan. 23, 2020

Related U.S. Application Data

(60) Provisional application No. 62/700,467, filed on Jul. 19, 2018.

(51) Int. Cl.

| | |
|---|---|
| *C08G 77/18* | (2006.01) |
| *C08K 3/32* | (2006.01) |
| *C09D 183/06* | (2006.01) |
| *C09D 183/04* | (2006.01) |
| *C09D 183/08* | (2006.01) |
| *C09D 4/00* | (2006.01) |
| *B29C 33/60* | (2006.01) |
| *C08G 77/14* | (2006.01) |
| *C08G 77/395* | (2006.01) |

(52) U.S. Cl.
CPC ........... *C09D 183/06* (2013.01); *C08G 77/18* (2013.01); *C08K 3/32* (2013.01); *C09D 4/00* (2013.01); *C09D 183/04* (2013.01); *C09D 183/08* (2013.01); *B29C 33/60* (2013.01); *C08G 77/14* (2013.01); *C08G 77/395* (2013.01)

(58) Field of Classification Search
CPC ...... C08G 77/18; C08G 77/14; C08G 77/395; C08G 77/00; C08K 3/32; C08K 2003/329; C08K 3/34; C09D 183/06; C09D 183/04; C09D 4/00; C09D 183/08; C09D 5/00; C09D 183/00; C09D 185/00; B29C 33/60

See application file for complete search history.

(56) References Cited

U.S. PATENT DOCUMENTS

| | | | |
|---|---|---|---|
| 4,801,628 A | | 1/1989 | Ashing et al. |
| 5,728,203 A | * | 3/1998 | Vorse ........................ C09D 4/00 |
| | | | 106/287.11 |
| 2005/0020758 A1 | * | 1/2005 | Terry ...................... C08G 77/00 |
| | | | 524/492 |
| 2007/0179268 A1 | * | 8/2007 | Lejeune ............... C09D 183/06 |
| | | | 528/26 |
| 2017/0305940 A1 | * | 10/2017 | Sha ......................... C07F 7/188 |

FOREIGN PATENT DOCUMENTS

| | | | | |
|---|---|---|---|---|
| CN | 101892115 A | | 11/2010 | |
| CN | 103161074 A | | 6/2013 | |
| CN | 106085169 A | | 11/2016 | |
| JP | WO2006075611 | * | 7/2006 | .......... D06M 13/507 |
| WO | 97/15700 A1 | | 5/1997 | |
| WO | WO9715700 | * | 5/1997 | ............. C23C 22/08 |
| WO | 2006/075611 A1 | | 7/2006 | |

OTHER PUBLICATIONS

English equivalent of WO 2006/075611 A1 by J-PlatPat (Year: 2021).*
Fischer Scientific part of Thermo Fischer Scientific [Retrieved on Nov. 17, 2021 <URL: https://www.fishersci.com/shop/products/3-glycidoxypropyltrimethoxysilane-97-thermo-scientific/AC216540050>] (Year: 2021).*
Chemical Book. Mono-(2,3-Epoxy)Propylether Terminated PDMS (2016) [retrieved from the internet at Dec. 7, 2022 from <URL: https://www.chemicalbook.com/ProductDetail_EN_mono-23-epoxypropylether-terminated-pdms_1891365.htm>]. (Year: 2016).*
Chemical Book. 3-Glycidoxypropyltrimethoxysilane (2016) [retrieved from the internet at Dec. 7, 2022 from <URL:https://www.chemicalbook.com/ProductDetail_EN_3-glycidoxypropyltrimethoxysilane_1899942.htm>], (Year: 2016).*
Water pH (2018) [retrieved from the internet at Dec. 7, 2022 from <URL: https://extension.usu.edu/waterquality/learnaboutsurfacewater/propertiesofwater/pH>] (Year: 2018).*
Chemical Book. Phosphoric acid (2016) [retrieved from the internet at Dec. 7, 2022 from <URL: https://www.chemicalbook.com/ProductDetail_EN_1528566.htm>] (Year: 2016).*
XP002794685; Database WPI, Week 201419, Thomson Scientific, London, GB; An 2013-S25672.
English Translation of WO2006075611.
International Search Report dated Oct. 10, 2019.

* cited by examiner

*Primary Examiner* — Kevin E Yoon
*Assistant Examiner* — Marites A Guino-O Uzzle
(74) *Attorney, Agent, or Firm* — MaxGoLaw PLLC

(57) ABSTRACT

A film forming formulation is provided that includes reaction products of phosphoric acid with a strained ring alkoxy silane. The phosphoric acid and the strained ring alkoxy silane are present in a molecular ratio of from 0.9-3.3:1. The film formulation also includes an aqueous solvent. A mold release coating composition is also provided that includes the film forming formulation, a reactive release agent, a base, and an aqueous solvent.

19 Claims, No Drawings

FILM FORMING FORMULATION AND COMPOSITION THEREOF

RELATED APPLICATIONS

This application claims priority benefit of U.S. Non-provisional application Ser. No. 16/515,746 filed 18 Jul. 2019; that in turn claims priority of U.S. Provisional Application Ser. No. 62/700,467 filed 19 Jul. 2018; the contents of which are hereby incorporated by reference.

FIELD OF THE INVENTION

The present invention in general relates to resinous reaction products useful for a variety of applications including adhesion to various substrates; and in particular to a film forming formulation of reaction products of phosphoric acid with a strained ring alkoxysilane in an aqueous solvent, and a mold release coating composition containing the film forming formulation.

BACKGROUND OF THE INVENTION

Coating compositions containing organic resins are in wide use. There are myriad of compositions produced by dissolving one or more film forming resins in organic solvent or by blending various emulsified film forming resins in semi-aqueous or fully aqueous "mediums". Glycidoxy functional film formers have been utilized as reactive portions of many film forming resin systems and formulations for many decades over the past century. Glycidoxy functional film formers have been used to positively impart many attributes to a variety of substrates including iron, steel, aluminum, glass, plastics and the like.

Unfortunately, many of the prior art glycidoxy functional film formers having handling concerns. Thus, there is a need for film forming formulations and compositions thereof that are not endocrine disrupting and avoid the inclusion of hazardous solvents that are deleterious to the environment. Furthermore, many of the prior art glycidoxy functional film formers require polymerization. Polymerization requires significant energy input as it utilizes reaction equipment, heat, catalysts, condensation, and further entails recovery of potentially hazardous byproducts. Due to the significant energy input requirements and the production of potentially hazardous byproducts, polymerization further compounds the hazards to both human health and the environment associated with many of the prior art glycidoxy functional film formers. Film forming formulations and compositions thereof that avoid these hazards to human health and the environment are therefore highly desirable.

The use of phosphoric acid as a modifier of glycidoxy functional film formers is well known and has found widespread use over many decades in the past century. Phosphoric acid has been used as a catalyst for solvent based "epoxy" and "epoxy-phenolic" coating compositions including without limitation the interior and/or exterior coatings for pipes (utilized to convey materials), exterior can coatings, and interior can coatings. Such solvent based "epoxy" and "epoxy phenolic" coating compositions are also hazardous to the environment and human health as they often contain or are themselves endocrine disrupting (both the epoxy and the phenol precursors).

U.S. Pat. No. 4,801,628 (Ashing et al.) discloses non-water dispersible, oxirane-defunctionalized, etherified, phosphoric acid esters of epoxy resins for use as varnishes (clear) or white enamels for drawn and ironed beer and beverage containers. Phosphoric acid reaction products of "oxirane" (glycidyl) resins are prepared in a water soluble, solvent base containing butyl cellosolve and/or butanol. The oxirane resins utilized are either the digylcidyl ether of bisphenol A (DGEBA) or reaction products of DGEBA with bisphenol A (BPA). Both the DGEBA and BPA are known endocrine disruptors.

Given the state of the prior art, there exists an unmet need for a film forming formulation that avoids the use of excessive solvents and production of harmful byproducts that are hazardous to the environment, and further avoids the use of endocrine disrupting materials. There further exists a need for coating compositions incorporating such a film formulation.

SUMMARY OF THE INVENTION

A film forming formulation is provided that includes reaction products of phosphoric acid with a strained ring alkoxy silane. The phosphoric acid and the strained ring alkoxy silane are present in a molecular ratio of from 0.9-3.3:1. The film formulation also includes an aqueous solvent.

A mold release coating composition is also provided that includes the inventive film forming formulation, a reactive release agent, a base, and an aqueous solvent.

DETAILED DESCRIPTION OF THE INVENTION

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention but are presented for illustrative and descriptive purposes only.

The present invention has utility as a film forming formulation that avoids the use of excessive solvents, endocrine disruptors, and production of byproducts that are hazardous to human health and the environment. The inventive formulation uses phosphoric acid as a "seed" or "center" which is utilized as a reactant for strained ring alkoxy silanes that can be reacted under ambient atmospheric conditions in an aqueous solvent in order to form a film forming reaction product. Variation of the stoichiometry of the phosphoric acid relative to the strained ring alkoxy silanes provides for formulation flexibility. The reaction products are extremely storage stable and are tunable when admixed with other functional materials, providing the ability to produce a variety of film forming formulations that exhibit a wide range of physical properties. This tunability allows for the flexibility to produce embodiments of the inventive film forming formulation with physical properties targeted to various specific materials and substrates. The present invention also has utility as a mold release coating composition incorporating the inventive film forming formulation.

It is to be understood that in instances where a range of values are provided that the range is intended to encompass not only the end point values of the range but also intermediate values of the range as explicitly being included within the range and varying by the last significant figure in the range. By way of example, a recited range from 1 to 4 is intended to include 1-2, 1-3, 2-4, 3-4, and 1-4

In at least one embodiment, the inventive film forming formulation includes reaction products of phosphoric acid with a strained ring alkoxy silane, of which γ-glycidoxy trialkoxy silanes represent a subset of such silanes operative herein, which are reacted under ambient atmospheric conditions in an aqueous solvent and avoids the use of excessive solvents, endocrine disruptors, and production of byproducts that are hazardous to human health and the environment. It is appreciated that the phosphoric acid and the strained ring alkoxy silane are present in a molecular ratio of from 0.9-3.3:1. It is further appreciated that variation of the molecular ratio of the phosphoric acid relative to the strained ring alkoxy silane provides flexibility allowing the inventive formulation to be tuned to achieve desired physical properties relative to various targeted substrates and materials. By way of non-limiting example, embodiments of the inventive film forming formulation have particular utility as basic materials for use in mold release compositions for elastomers and other molding mediums. It is appreciated that the inventive formulation has a pH of between 3.0 and 8.0. It is also appreciated that adjustment of formulation pH within the range of 3.0 to 8.0 provides another mode of tunability. It is further appreciated that another mode of tunability of the inventive film forming formulation may also be provided by altering the types of alkoxys of the strained ring alkoxy silane. A strained ring alkoxy silane operative herein is a monomer or oligomer that typically has an average molecular weight of less than 4,000 Daltons having a formula (I):

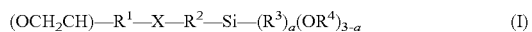

(I)

where $R^1$ is $C^1$-$C^4$ alkyl, an aromatic, a heteroaromatic, or together with (OCH$_2$CH) forms (OC6H$_9$); X is a nullity or oxygen, $R^2$ is $C_2$-$C_6$ alkyl, an aromatic, or a heteroaromatic; $R^3$ in each occurrence is independently $C_1$-$C_6$ alkyl, a is an integer of 0 to 2, inclusive; $R^4$ in each occurrence is independently $C_1$-$C_6$ alkyl or ($C_1$-$C_4$ alkyl)-O—($C_1$-$C_4$ alkyl), where the alkyl ether groups need not be alike. It is appreciated that an alkyl as used herein is linear, branched or cyclic with the proviso that cyclic alkyls are $C_4$-$C_6$. Strained ring alkoxy silanes operative herein illustratively include 2-(3,4 epoxycyclohexyl) ethyltrimethoxysilane, 3-glycidoxypropyl methyldimethoxysilane, 3-glycidoxypropyl trimethoxysilane, 3-glycidoxypropyl methyldiethoxysilane, 3-glycidoxypropyl triethoxysilane, and combinations thereof.

In at least one embodiment, the phosphoric acid and the strained ring alkoxy silane of the inventive film forming formulation are present in a molecular ratio of 3:1. In at least one preferred embodiment, when present in a molecular ratio of 3:1, the phosphoric acid is present from 20 to 40 weight percent of the total weight of the formulation, and the strained ring alkoxy silane is present from 60 to 80 weight percent of the total weight percent of the formulation. In another preferred embodiment, when present in a molecular ratio of 3:1, the phosphoric acid is present from 25 to 35 weight percent of the total weight of the formulation, and the strained ring alkoxy silane is present from 65 to 75 weight percent of the total weight percent of the formulation.

In at least one embodiment, the phosphoric acid and the strained ring alkoxy silane of the inventive film forming formulation are present in a molecular ratio of 3:2. In at least one preferred embodiment, when present in a molecular ratio of 3:2, the phosphoric acid is present from 10 to 25 weight percent of the total weight of the formulation, and strained ring alkoxy silane is present from 70 to 90 weight percent of the total weight percent of the formulation. In another preferred embodiment, when present in a molecular ratio of 3:2, the phosphoric acid is present from 15 to 20 weight percent of the total weight of the formulation, and the strained ring alkoxy silane is present from 75 to 85 weight percent of the total weight percent of the formulation.

In at least one embodiment, the phosphoric acid and the strained ring alkoxy silane of the inventive film forming formulation are present in a molecular ratio of 3:3. In at least one preferred embodiment, when present in a molecular ratio of 3:3, the phosphoric acid is present from 5 to 20 weight percent of the total weight of the formulation, and the strained ring alkoxy silane is present from 80 to 95 weight percent of the total weight percent of the formulation. In another preferred embodiment, when present in a molecular ratio of 3:3, the phosphoric acid is present from 10 to 15 weight percent of the total weight of the formulation, and the strained ring alkoxy silane is present from 85 to 90 weight percent of the total weight percent of the formulation.

The use of reactions products of monofunctional glycidoxy functional alkoxy silane with phosphorus has been found by the inventors to overcome many of the disadvantages of prior art glycidoxy film forming formulation and systems. By way of non-limiting example, it has been found that, relative to the prior art, reaction products of the inventive film formulation are formed without the use of excessive solvents, endocrine disrupting materials, and production of hazardous byproducts. This has the benefit of reduction of both the production and the presence of these harmful materials in the inventive film forming formulation—materials that are hazardous to both human health and the environment. In at least one embodiment, the reaction products are concentrated to a total non-volatile content of greater than 2.4 weight percent of the total weight of the formulation. In at least one preferred embodiment, the reaction products are concentrated to a total non-volatile content of greater than 15 weight percent of the total weight of the formulation. In still another preferred embodiment, the reaction products are concentrated to a total non-volatile content of greater than 30 weight percent of the total weight of the formulation.

A mold release coating composition is also provided. In at least one inventive embodiment, the mold release coating composition includes the inventive film forming formulation, a reactive release agent, a base, and an aqueous solvent. In at least one embodiment, the coating composition has a pH of between 3.0 and 8.0. In at least one embodiment of the inventive mold release coating composition, a first quantity of the phosphoric acid and the strained ring alkoxy silane is present in a molecular ratio of 3:2 and the reaction products of the first quantity are present from 1.0 to 2.5 weight percent of the total weight percent of the composition. In another inventive embodiment, the reaction products of the first quantity are present from 1.5 to 2.0 weight percent of the total weight percent of the composition. In at least one inventive embodiment, in addition to the first quantity, the mold release coating composition has a second quantity of the phosphoric acid and the strained ring alkoxy silane present in a molecular ratio of 3:3 with the reaction products of the second quantity present from 1.0 to 2.5 weight percent of the total weight percent of the composition. In another embodiment the reaction products of the second quantity are present from 1.5 to 2.0 weight percent of the total weight percent of the composition.

In at least one embodiment, a reactive release agent is provided and is present from 1.5 to 2.0 weight percent of the total weight percent of the formulation. In at least one inventive embodiment, the reactive release agent is a mono epoxide functional release agent. It is appreciated that the inventive mold release coating composition in some applications functions as a semi-permanent mold release. Semi-permanent in the context of the present invention is intended to define coatings of the inventive mold release coating composition applied to a mold surface and which provide for more than one release per application.

In at least one inventive embodiment, the reaction products are aged between 12 and 36 months. In another inventive embodiment, the reaction products are aged 18 to 24 months. It is appreciated that the aged reaction products allow for the inventive mold release coating composition to be extremely storage stable.

In at least one inventive embodiment, the inventive mold release coating composition includes at least one of an emulsifier, a catalyst, an antimicrobial agent, a filler, a pigment, a dye, a wetting agent, a surfactant, a thickening agent, a thixotropic agent, a siccative, an anti-skinning agent, or combinations thereof.

A thixotropic agent operative in some inventive embodiments of the present invention illustratively includes fumed silica, organoclays, inorganic clays, and precipitated silica. Multifunctional alcohols are commonly used to enhance thixotropic properties.

Fillers operative in the present invention illustratively include talc, mica, alumina trihydrate, calcium sulfate, calcium carbonate, magnesium sulfate, magnesium carbonate, barium sulfate, and microspheres.

A siccative additive is provided in some inventive embodiments of the present invention to regulate the drying speed of the formulation. A siccative operative in some inventive embodiments of the present invention illustratively includes a transition metal carboxylate for which medium- to long-chain linear or branched carboxylic acids—most commonly 2-ethyl hexanoic acid or various naphthenic acids are used as ligands, and combinations thereof. Transition metals typically include cobalt, zirconium, and manganese; and are routinely used in the printing industry as drying accelerators.

The present invention is further illustrated with respect to the following non-limiting example:

Example 1

A comparative mold release coating composition is compared relative to an inventive mold release composition containing the same reactive release agent. The comparative release coating composition is composed of 87 total weight percent deionized water, 11 total weight percent of 3-glycidoxypropyl trimethoxysilane (that has been alocoholyzed in acidified water) and 2 total weight percent of mono epoxide functional, polydimethyl siloxane emulsified polymer. The inventive mold release composition is the same as the comparative mold release coating composition except a 3 times stoichiometric amount of phosphoric acid relative to the 3-glycidoxypropyl trimethoxysilane replaces a like weight of water.

An article molded of 100 parts VITON®, 3 parts zinc oxide, 30 parts carbon black, 3 parts ethylene/acrylic elastomer and 3 parts or organic peroxide is a difficult to release peroxide cured fluoroelastomer. The article was molded in a cavity that had been coated with the comparative mold release composition. The molded article would not come out of the mold and had to be cut out. In contrast, the inventive mold release coating composition was applied to a hot mold and the same difficult to release fluoroelastomer was molded and freely released. The inventive mold release coating composition provided for at least three releases of the same fluoroelastomer. The subsequent reapplication ("a touch-up") of the inventive mold release coating composition provided for at least three additional releases for each "touch-up".

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments and those skilled in the art will recognize that modifications and changes can be made to the preferred embodiments of the invention without departing from the scope of this invention defined in the following claims.

The invention claimed is:

1. A film forming formulation comprising:
a reaction product of phosphoric acid with a species consisting of a single type of strained ring alkoxy silane, where the phosphoric acid and the single type of strained ring alkoxy silane are present in a molecular ratio of from 0.9-3.3:1; and a water based aqueous solvent in which the phosphoric acid and the single type of strained ring alkoxy silane are dissolved to have an overall pH of over 3.1 and equal to or less than 8.0, wherein said single type of strained ring alkoxy silane has an average molecular weight of less than 4,000 Daltons and has a formula (I):

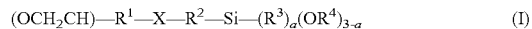

$$(OCH_2CH)-R^1-X-R^2-Si-(R^3)_a(OR^4)_{3-a} \qquad (I)$$

where $R^1$ is $C_1$-$C_4$ alkyl, an aromatic, a heteroaromatic, or together with $(OCH_2CH)$ forms $(OC_6H_9)$; X is a nullity or oxygen, $R^2$ is $C_2$-$C_6$ alkyl, an aromatic, or a heteroaromatic; $R^3$ in each occurrence is independently $C_1$-$C_6$ alkyl, a is an integer of 0 to 2, inclusive; and $R^4$ in each occurrence is independently $C_1$-$C_6$ alkyl or $(C_1$-$C_4$ alkyl)-O-$(C_1$-$C_4$ alkyl).

2. The formulation of claim 1 wherein the phosphoric acid and the single type of strained ring alkoxy silane are present in a molecular ratio of 3:1.

3. The formulation of claim 1 wherein the phosphoric acid is present from 20 to 40 weight percent of the total weight of the formulation and the single type of strained ring alkoxy silane is present from 60 to 80 weight percent of the total weight percent of the formulation.

4. The formulation of claim 1 wherein the phosphoric acid and the single type of strained ring alkoxy silane are present in a molecular ratio of 3:2.

5. The formulation of claim 4 wherein the phosphoric acid is present from 10 to 25 weight percent of the total weight of the formulation and the single type of strained ring alkoxy silane is present from 70 to 90 weight percent of the total weight percent of the formulation.

6. The formulation of claim 1 wherein the phosphoric acid and the single type of strained ring alkoxy silane are present in a molecular ratio of 3:3.

7. The formulation of claim 6 wherein the phosphoric acid is present from 5 to 20 weight percent of the total weight of the formulation and the single type of strained ring alkoxy silane is present from 80 to 95 weight percent of the total weight percent of the formulation.

8. The formulation of claim 1 wherein said single type of strained ring alkoxy silane has three alkoxy groups that are all the same and all either methoxy or ethoxy.

9. The formulation of claim 1 wherein said single type of strained ring alkoxy silane has three alkoxy groups that are each independently one of: a methoxy, an ethoxy, a propoxy, a butoxy, a pentoxy, a hexoxy, a heptoxy, an octoxy, a nonoxy, or a decoxy.

10. The formulation of claim 1 wherein said reaction product is concentrated to a total non-volatile content of greater than 2.4 weight percent of the total weight of the formulation.

11. The formulation of claim 1 wherein said reaction product is concentrated to a total non-volatile content of greater than 15 weight percent of the total weight of the formulation.

12. A film forming formulation comprising:
a reaction product of phosphoric acid with a species consisting of a single type of strained ring alkoxy silane, where the phosphoric acid and the single type of strained ring alkoxy silane are present in a molecular ratio of from 0.9-3.3:1; and a water based aqueous solvent in which the phosphoric acid and the single type of strained ring alkoxy silane are dissolved to have an overall pH of over 3.1 and equal to or less than 8.0, wherein said single type of strained ring alkoxy silane is 2-(3,4-epoxycyclohexyl)ethyltrimethoxysilane, 3-glycidoxypropyl methyldimethoxysilane, 3-glycidoxypropyl trimethoxysilane, 3-glycidoxypropyl methyldiethoxysilane, or 3-glycidoxypropyl triethoxysilane.

13. A mold release coating composition comprising:
the formulation of claim 1
a reactive release agent;
a base; and
a water based aqueous solvent to have a pH of over 3.1 and equal to or less than 8.0.

14. The composition of claim 13 wherein a first quantity of the phosphoric acid and the 7-glycidoxy trialkoxy silane is present in a molecular ratio of 3:2 and said reaction product of said first quantity are present from 1.0 to 2.5 weight percent of the total weight percent of the composition.

15. The composition of claim 13 further comprising a second quantity of the phosphoric acid and said single type of strained ring alkoxy silane being present in a molecular ratio of 3:3 and said reaction product of said second quantity being present from 1.0 to 2.5 weight percent of the total weight percent of the composition.

16. The composition of claim 13 wherein said reaction product of said second quantity are present from 1.5 to 2.0 weight percent of the total weight percent of the composition.

17. The composition of claim 13 wherein said reactive release agent is present from 1.5 to 2.0 weight percent of the total weight percent of the composition.

18. The composition of claim 13 wherein said reactive release agent is a mono epoxide functional release agent.

19. The composition of claim 13 further comprising at least one of an emulsifier, a catalyst, an antimicrobial agent, a filler, a pigment, a dye, a wetting agent, a surfactant, a thickening agent, a thixotropic agent, a siccative, an anti-skinning agent or combinations thereof.

* * * * *